(12) United States Patent
Judkins et al.

(10) Patent No.: US 7,273,529 B2
(45) Date of Patent: Sep. 25, 2007

(54) METHOD OF MAKING A WINDOW COVERING FROM FABRIC SEGMENTS

(76) Inventors: Ren Judkins, 46 Newgate Rd., Pittsburgh, PA (US) 15202; John D. Rupel, P.O. Box 7342, Appleton, WI (US) 54912

( * ) Notice: Subject to any disclaimer, the term of this patent is extended or adjusted under 35 U.S.C. 154(b) by 309 days.

(21) Appl. No.: 11/105,079

(22) Filed: Apr. 13, 2005

(65) Prior Publication Data

US 2005/0224161 A1    Oct. 13, 2005

Related U.S. Application Data

(60) Provisional application No. 60/561,635, filed on Apr. 13, 2004.

(51) Int. Cl.
*E06B 9/262* (2006.01)
*B29C 65/00* (2006.01)

(52) U.S. Cl. .................. 156/65; 156/94; 156/153; 156/182; 156/264; 156/266; 160/84.01

(58) Field of Classification Search .............. 156/65, 156/94, 153, 182, 264, 266; 160/84.05
See application file for complete search history.

(56) References Cited

U.S. PATENT DOCUMENTS

| | | |
|---|---|---|
| RE31,129 E | 1/1983 | Rasmussen |
| 4,694,144 A | 9/1987 | Delaroche et al. |
| 5,193,601 A | 3/1993 | Corey et al. |
| 5,691,031 A | 11/1997 | Swiszcz et al. |
| 5,702,552 A | 12/1997 | Kutchmarek et al. |
| 5,834,090 A | 11/1998 | Huang |
| 6,019,864 A | 2/2000 | Jones |
| 6,206,075 B1 | 3/2001 | Prince et al. |
| 6,568,453 B2 | 5/2003 | Zorbas |

*Primary Examiner*—Jeff H. Aftergut
*Assistant Examiner*—Michael A Tolin
(74) *Attorney, Agent, or Firm*—Buchanan Ingersoll & Rooney PC

(57) ABSTRACT

In a method for making a window covering the user selects a first segment of cellular material in which there is a top cell having a top surface, at least one glue line on the top surface and a strip of fabric on the at least one glue line. The strip of fabric and at least a portion of the glue line are removed from the top surface of the top cell and a second glue line is applied to that top surface. A second segment of cellular material is place over the second glue line on the top surface of the top cell of the first segment. The glue line cures and bonds the second segment of cellular material to the first segment of cellular material. If the cellular material has tabbed cells the processes can be used to join the tabs of the two segments together.

20 Claims, 4 Drawing Sheets

METHOD OF MAKING A WINDOW COVERING FROM FABRIC SEGMENTS

CROSS-REFERENCE TO RELATED APPLICATION

This application claims priority to U.S. Provisional Patent Application Ser. No. 60/561,635, filed Apr. 13, 2004.

BACKGROUND OF THE INVENTION

1. Field of Invention

This invention relates to window coverings having a stack of cellular material attached between a headrail and a bottom rail in which the material is formed from physically similar remnant pieces of cellular fabric.

2. State of the Art

One common type of window covering has a panel of cellular material connected between a headrail and a bottom rail. These window coverings are sold in standard stock sizes and are custom made by fabricators. The fabricators buy standard headrails, bottom rails and related hardware as well as stacks or blankets of cellular fabrics. The fabricators measure the windows to be covered. Then they select or cut down a standard headrail and bottom rail for each window and cut a panel of material from the blanket which is the correct width and length for the window. Quite often the fabricator will have segments of these blankets which are too small to use. Some of these segments may be as much as twelve feet wide and only three feet long. Typically, this left-over fabric is discarded.

In U.S. Pat. No. 6,019,864 Jones discloses a method and apparatus for combining segments of cellular material to form a composite window covering. If necessary, the short segments to be interconnected are trimmed to a uniform width consistent with the width of a window area to be covered. Thereafter, a cell of each short length to be connected is trimmed to provide a neat attachment surface strip. Glue beads are run along each edge of each attachment surface strip of the short length of cellular fabric to be attached, and the glue covered attachment surface is pressed against a clean (non-glued) attachment surface strip of a short receiving length to which attachment is to be made. Pressure is released after initial bonding has occurred. The resulting bond between the two segments is thus comprised of two original glue lines, two strips of fabric and the new glue beads. This bond will be twice or three times the thickness of the bonds between all other cells in the combined stack and is quite noticeable. Consequently, there is a need for a method of combining segments of cellular and pleated materials in a manner so that the resulting structure has a uniform appearance.

SUMMARY OF THE INVENTION

We provide a method for making a window covering from segments of cellular or tabbed material. When using cellular material containing a plurality of cells we select a first segment of cellular material in which there is a top cell having a top surface, at least one glue line on the top surface and a strip of fabric on the at least one glue line. Then we remove the strip of fabric and at least a portion of the glue from the top surface of the top cell. Next we apply a second glue line to the top surface of the top cell. Then we place a second segment of cellular material over the second glue line on the top surface of the top cell and allow the second glue line to cure thereby bonding the second segment of cellular material to the first segment of cellular material.

The strip of fabric and portion of glue could be removed by grinding, milling, cutting or sanding. One might heat the glue to soften it and then peel or scrape the fabric strip and glue away. One could freeze the glue and then crack the frozen glue to remove the strip of fabric and at leas some of the glue.

The methods just described for joining segments of cellular materials can also be used for joining segments of tabbed material in which each tab is comprised of two layers of fabric connected together by at least one glue line. We first remove the top layer of fabric and at least a portion of the glue line from the bottom layer of the top tab of a segment of tabbed material. Next we apply at least one new glue line to that bottom layer of fabric. Then we select a second segment of tabbed material in which the bottom tab is a single layer of material. This single layer could have been created from tab comprised of two layers of fabric glued together by removing the outermost layer of fabric and a portion of the glue or may have been made to have only a single fabric layer. Next we place that tab onto the new glue line on the first segment of tabbed material and allow the glue to cure thereby bonding the second segment of tabbed material to the first segment of tabbed material.

The segments of cellular material as well as the segments of tabbed material may have been cut from a wider segment of material.

Other objects and advantages of our method of making a window covering from fabric segments will become apparent from certain present preferred embodiments thereof illustrated in the drawings.

DESCRIPTION OF THE PREFERRED EMBODIMENTS

Figure 1:
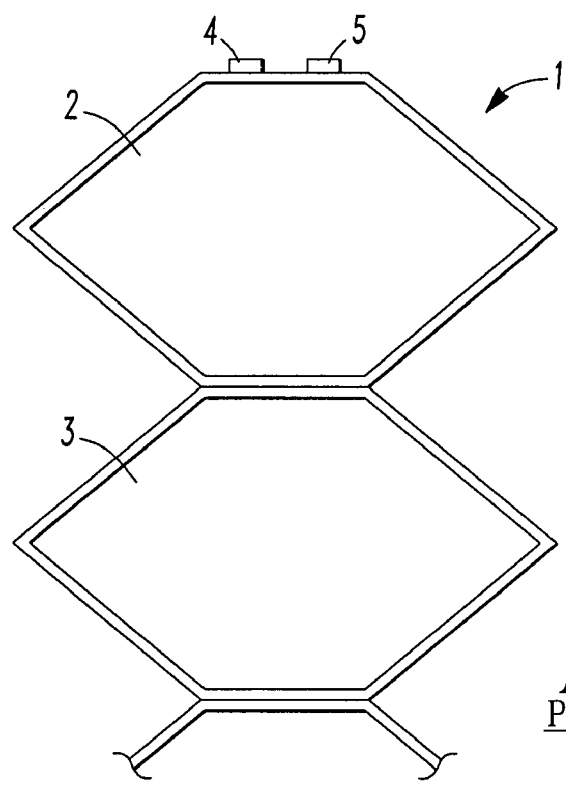
FIG. 1 is a perspective view of a fragment of a cellular fabric panel.

A typical single cell material 1 shown in FIG. 1 has a series of cells 2, 3 in which adjacent cells are glued together. There may be a single glue line or multiple glue lines. One common practice is to provide two parallel glue lines 4, 5 spaced apart a sufficient distance so that holes for lift cords can be easily drilled through the cellular fabric between the glue lines. A fabricator typically purchases cellular material in standard sizes which may be widths of eight to fourteen feet or more and lengths of twelve to fifty feet. From these blankets of cellular material the fabricator cuts a sufficient amount of material to cover a window. Typically, these pieces will be three to four feet wide and six to eight feet in length. Consequently, it is quite common for a fabricator to have left over segments of cellular material. For example, if a fabricator makes three shades which are four feet wide and eight feet long from a 12'×12' blanket, he will have a segment of cellular material which is twelve feet wide and four feet long. A window of this size is quite rare. However, if the fabricator could cut the twelve foot segment into three four feet widths and then bond them together, he would have a segment that could be used in a four foot wide window having a length up to twelve feet. Since all segments would be cut from the same material the segments would match when bonded together.

We provide a method of bonding such segments together in which fabric and a portion of the glue along the top surface of the top cell of the segment from which other pieces have been cut is removed. It is not practical to remove all of the glue because some of the original glue will have migrated between the fibers of the fabric. Nevertheless, a substantial portion of that glue is removed.

Those skilled in the art will recognize that cellular materials used in window coverings have been made from films, paper, woven materials, non-woven materials and composites of one or more films, papers, woven materials and non-woven materials. For ease of reading, the word fabric will be used to describe and claim the segments used in the present method. However, it should be understood that the word fabric as used herein includes films, paper, woven materials, non-woven materials and composites thereof.

Figure 2:
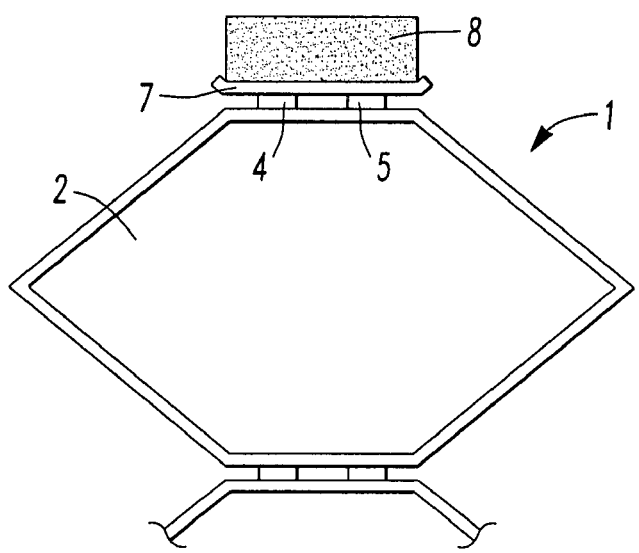
FIG. 2 is an end view of the fragment of cellular material shown in FIG. 1 in which the fabric and glue are being removed by grinding.

In one preferred method illustrated in FIG. 2 a grinding wheel 8 is used to grind away any fabric 7 and much of the glue of glue lines 4 and 5. After this fabric and glue has been removed the segment is ready for being bonded to another similarly prepared cellular segment. Although we illustrate a grinding head in FIG. 2, any material removal process such as milling, sanding or cutting could be used.

Figure 3:
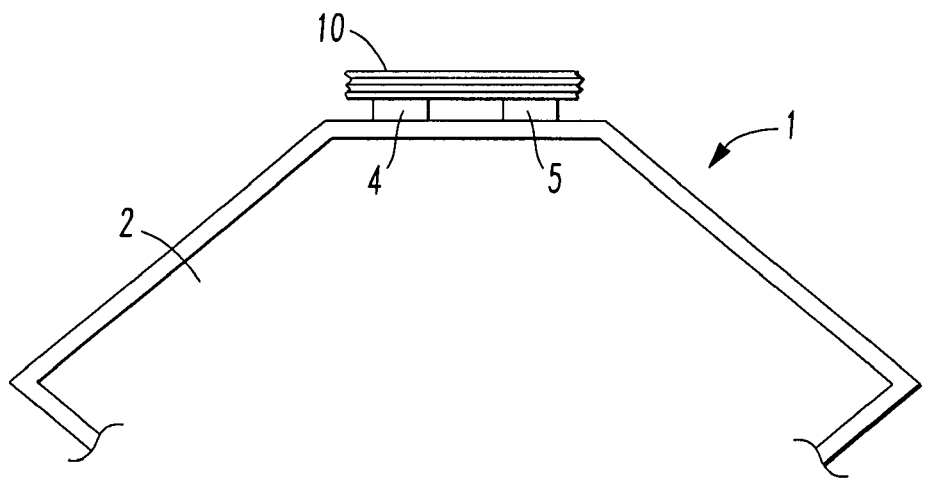
FIG. 3 is an end view of a portion of a cellular material made from a laminated fabric.
Figure 4:
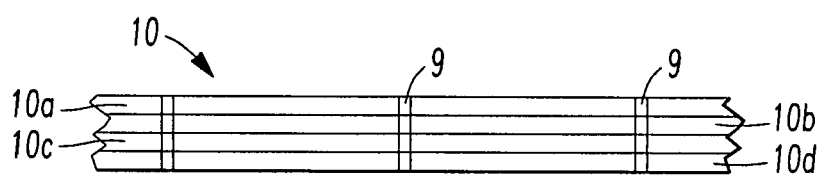
FIG. 4 is an enlarged perspective view of a portion of the laminated fabric used in the cellular material of FIG. 3.
Figure 5:
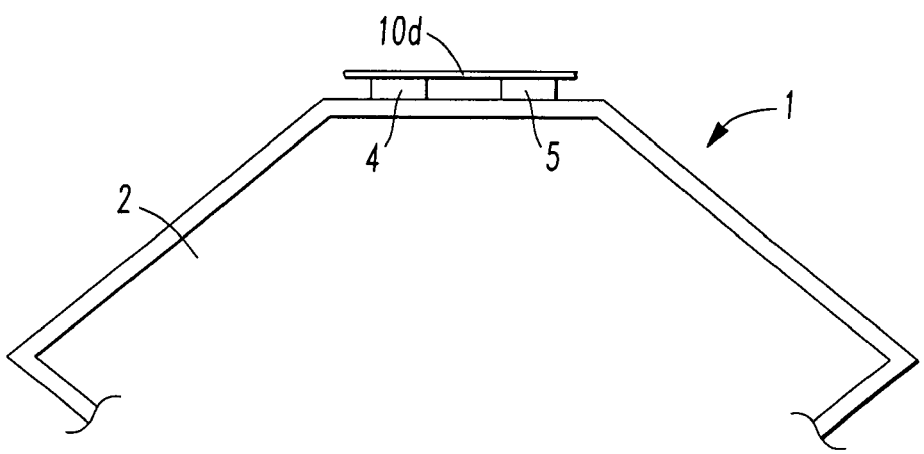
FIG. 5 is an end view similar to FIG. 3 after much of the fabric has been removed.

Some fabrics 10 shown in FIG. 4 are laminates of multiple thin layers of fabric. These layers 10a, 10b, 10c and 10d in the fabric of FIG. 4 are point bonded at spaced apart locations 9. When such material 10 is used in a cellular product, shown in FIG. 3, it may be sufficient to simply remove all but one layer of the multi-layer fabric. This can be done by grinding as illustrated in FIG. 2 or cutting or even tearing the other layers 10a, 10b, 10c from the cellular segment. The resulting structure would appear as in FIG. 5 in which there is single layer 10d on cell 2. A cellular segment prepared as shown in FIG. 5 is now ready for bonding to another segment.

Figure 6:
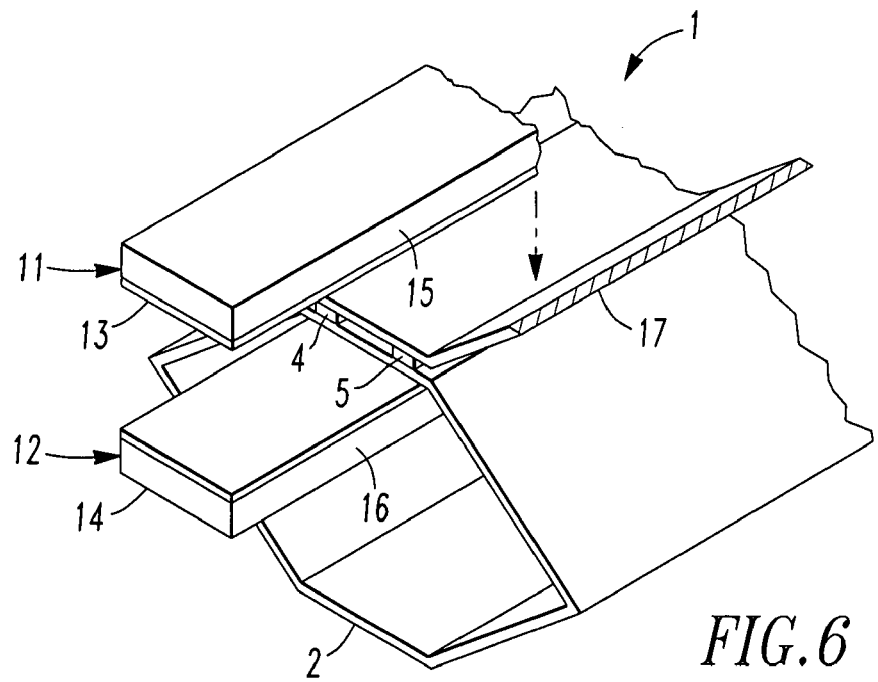
FIG. 6 is a perspective view of a fragment of cellular material into which heated paddles are being inserted to melt the original glue.

Another way of preparing the segments for bonding together is illustrated in FIG. 6. We provide two elongated paddles 11, 12 sized to fit within a cell 2 of cellular material 1. Each paddle has a heated surface 13, 14 which presses against the area of the cell having glue lines 4, 5. An insulator 15, 16 is provided on and possibly around the edges of each of the heated surfaces 13, 14. The elongated paddles 11 and 12 are placed on either side of the bond area and heated sufficiently to melt the adhesive 4 and 5. The paddles should not be so hot that they damage the fabric. Then, the paddles are removed and the piece of fabric 17 which overlays the glue lines is peeled away taking with it a portion of the melted glue. If desired, any remaining glue may be scraped away with a hot knife. For some cellular products only a single paddle may be sufficient to melt the glue. Upon completion of this process the cellular structure will have a small portion 4a, 5a of the original glue lines on the cell 2. Those portions are shown in FIG. The method illustrated in FIG. 6 can be used only when the original glue is a low temperature thermoplastic adhesive. Such adhesives typically have a melting temperature at 350° F. or less. After the cellular structure has been prepared by grinding or melting as illustrated in FIGS. 2 and 6, a new glue line 20 is applied over the remaining glue portions 4a and 5a. The cellular structure is then ready to be bonded to another cellular segment.

Yet another method of removing the old glue is to use a laser to heat and soften the original glue so that it can be peeled or scraped away.

Another way of removing much of the original adhesive 4, 5 is to freeze the glue and then crack the glue away from the original cell 2. Yet another method is to apply a solvent such as methylene chloride which will dissolve the glue allowing much of it to be removed. The selected solvent should not damage the fabric.

Figure 8:
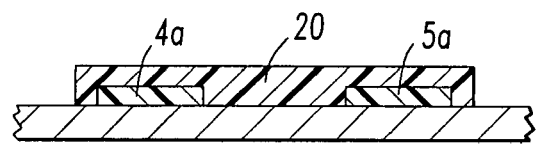
FIG. 8 is an enlarged view of the glue and portion of the fabric shown in FIG. 7.

When the new glue line 20 is applied as shown in FIG. 8 that line may be wider than the original glue line. This will assure that when the two segments are bonded together there will be an even bond along the front of the shade. However, the new glue line should extend only a slight distance beyond the original glue line, preferably not more than 1 millimeter, so that the cells around the bond area of the two segments do not appear to be differently shaped than other cells in the combined stack.

Figure 7:
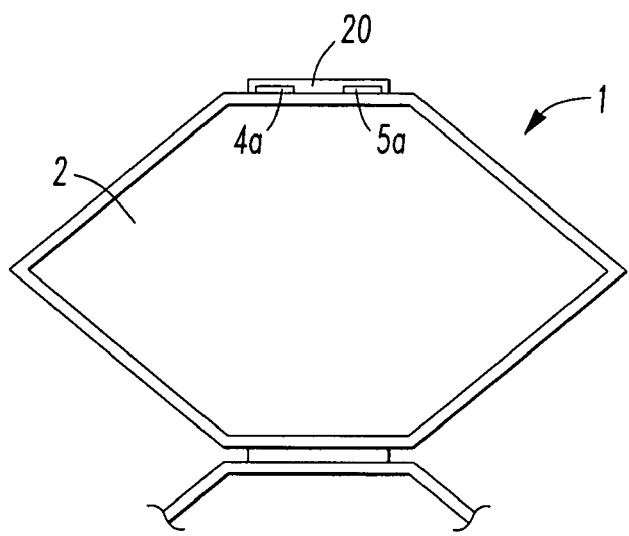
FIG. 7 is an end view of a fragment of cellular material after much of the original glue has been removed and a new glue line has been applied.
Figure 9:
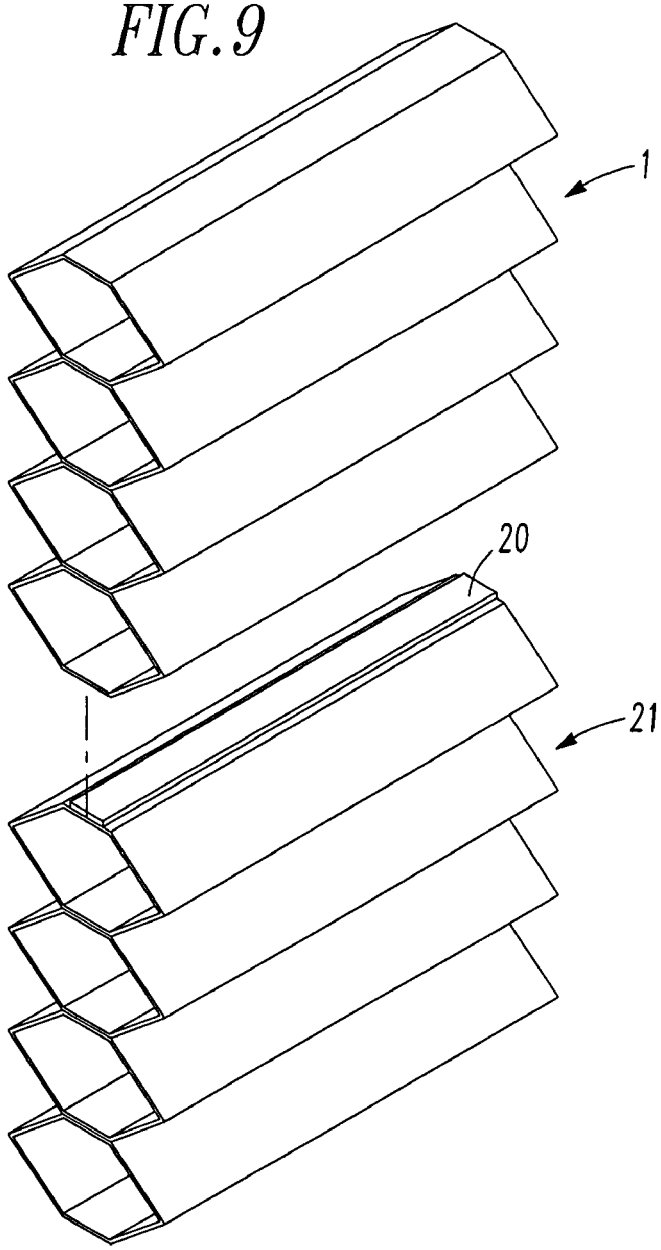
FIG. 9 is a perspective view of two cellular segments prepared and aligned for bonding.

After the segments have been prepared as described and a new glue line has been provided as shown in FIGS. 7 and 8, the segments 1 and 21 are joined together as illustrated in FIG. 9. For most adhesives the glue line is placed on only one segment. If a two part adhesive is used one part is applied to one segment 1 and the second part is applied to the second segment 21. The resulting bond will be only 1 to 2 thousands of an inch thick. Such a bond is not perceptibly thicker than any other bond in the segments being joined. Consequently, a casual observer would not know that the finished product was made from two or more segments of cellular material.

We prefer that the new glue 20 which is used to bond segments together be a high temperature adhesive which will not melt when holes are drilled through the glue for lift cords. However, any adhesive commonly used to make window coverings can be used.

A fixture or other equipment will be used to combine the two segments together. Suitable equipment is described in U.S. Pat. No. 6,019,864 to Jones which is incorporated herein by reference. Preferably, the equipment will have a wall or other structure against which the front pleats of the stack abut. The glue applicator is a selected distance from that wall, such as 5 to 10 millimeters, and moves along a path parallel to the wall. This assures that the glue line will be the selected distance from, and parallel to, the front pleats. In one embodiment the glue applicator is positioned on the lower segment. Then the upper segment is placed on top of the lower segment and glue applicator. The glue applicator moves between the two segments parallel to the front pleats applying glue as it moves. The weight of the upper segment may be sufficient to press the two segments together and achieve the desired bond. In this embodiment the segments lie in a vertical plane. If desired, the segments could be on a flat or inclined table when being joined together.

Figure 10:
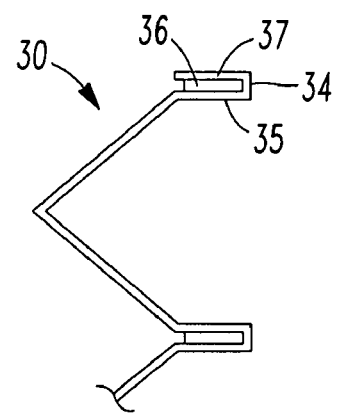
FIG. 10 is an end view of a fragment of tabbed material.
Figure 11:
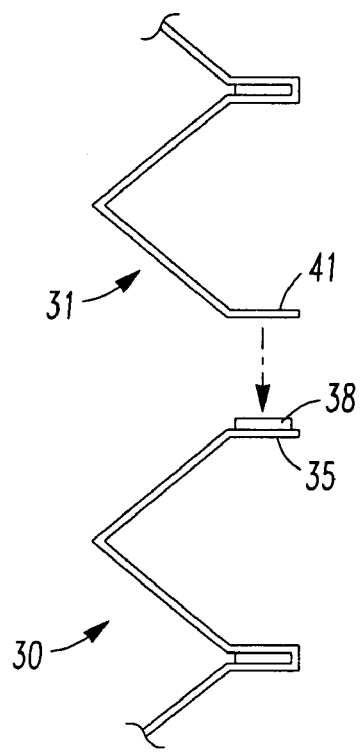
FIG. 11 is an end view of two fragments of tabbed material after much of the original glue and to layer of fabric has been removed from the tabs to be joined and a new glue line has been applied to one such tab.

The method we have described for joining segments of cellular materials can also be used for joining segments of tabbed material in which each tab is comprised of two layers of fabric connected together by at least one glue line. Such segments 30, 31 are shown in FIGS. 10 and 11. When the process begins tabbed segment 30 has a top tab 34 having a bottom layer of fabric 35, at least one glue line 36 on the bottom layer of fabric and a top layer of fabric 37 on the at least one glue line. Using any of the techniques described above for removing the strip of fabric from the top cell in the segment of cellular material, we first remove the top layer of fabric 37 and at least a portion of the glue line 36 from the bottom layer 35 of the top tab 34. Next we apply at least one glue line 38 to the bottom layer of fabric 35 of the top tab. That new glue line is shown in FIG. 11. Next we select a second segment of tabbed material 31 in which the bottom tab 41 is a single layer of material. This single layer could have been created from tab comprised of two layers of fabric glued together by removing the outermost layer of fabric and a portion of the glue or may have been made to have only a single fabric layer. Next we place tab 41 onto glue line 38 on the bottom layer 35 of the top tab 34 of segment 30 and allow the glue to cure thereby bonding the second segment of tabbed material 31 to the first segment of tabbed material 30.

Although we have illustrated single cell materials, our invention is not so limited. Our process could be used for double cell or other multi-cell materials.

We claim:

1. A method for making a window covering from segments of cellular material containing a plurality of cells comprising:
   selecting a first segment of cellular material in which there is a top cell having a top surface, at least one glue line on the top surface and a strip of fabric on the at least one glue line;
   removing the strip of fabric and at least a portion of the at least one glue line from the top surface of the top cell;
   applying at least one second glue line to the top surface of the top cell;
   selecting a second segment of cellular material;
   placing the second segment of cellular material over the at least one second glue line on the top surface of the top cell:
   allowing the at least one second glue line to cure thereby bonding the second segment of cellular material to the first segment of cellular material.

2. The method of claim 1 wherein the strip of fabric and at least a portion of the at least one glue line are removed from the top surface of the top cell by at least one of milling, cutting, grinding and sanding.

3. The method of claim 1 wherein the strip of fabric and at least a portion of the at least one glue line are removed from the top surface of the top cell by heating the at least one glue line to soften the at least one glue line and peeling away the strip of fabric and a portion of the at least one glue line.

4. The method of claim 3 also comprising scraping away a second portion of the at least one glue line after peeling away the strip of fabric and a portion of the at least one glue line.

5. The method of claim 3 wherein the at least one glue line is comprised of a thermoplastic adhesive and is heated by placing at least one heated paddle adjacent the top surface of the top cell.

6. The method of claim 3 wherein the at least one glue line is heated by a laser beam.

7. The method of claim 1 wherein first segment of cellular material and the second segment of cellular material are a single cell cellular material or double cell cellular material.

8. The method of claim 1 wherein the strip of fabric and at least a portion of the at least one glue line are removed from the top surface of the top cell by freezing and then cracking the at least one glue line.

9. The method of claim 1 wherein the strip of fabric and at least a portion of the at least one glue line are removed from the top surface of the top cell by applying a solvent to the at least one glue line, allowing at least a portion of the at least one glue line to dissolve and pulling the strip of fabric and at least a portion of the at least one glue line away from the top surface of the top cell.

10. The method of claim 9 wherein the solvent is methylene chloride.

11. A method for making a window covering from a segment of cellular material containing a plurality of cells comprising:
    selecting a segment of cellular material having a known width;
    cutting the segment of cellular material having a known width into at least two smaller segments of cellular material, each smaller segment having a selected width smaller than the known width, a first one of the smaller segments having a top cell having a top surface, at least one glue line on the top surface and a strip of fabric on the at least one glue line;
    removing the strip of fabric and at least a portion of the at least one glue line from the top surface of the top cell;
    applying at least one second glue line to the top surface of the top cell;
    selecting a second one of the smaller segments of cellular material;
    placing the second one of the smaller segments of cellular material over the at least one second glue line on the top surface of the top cell:
    allowing the at least one second glue line to cure thereby bonding the second one of the smaller segments of cellular material to the first one of the smaller segments of cellular material.

12. The method of claim 11 wherein the strip of fabric and at least a portion of the at least one glue line are removed from the top surface of the top cell by at least one of milling, cutting, grinding and sanding.

13. The method of claim 11 wherein the strip of fabric and at least a portion of the at least one glue line are removed from the top surface of the top cell by heating the at least one glue line to soften the at least one glue line and peeling away the strip of fabric and a portion of the at least one glue line.

14. The method of claim 13 also comprising scraping away a second portion of the at least one glue line after peeling away the strip of fabric and a portion of the at least one glue line.

15. The method of claim 13 wherein the at least one glue line is comprised of a thermoplastic adhesive and is heated by placing at least one heated paddle adjacent the top surface of the top cell.

16. The method of claim 13 wherein the at least one glue line is heated by a laser beam.

17. The method of claim 11 wherein first segment of cellular material and the second segment of cellular material are a single cell cellular material or double cell cellular material.

18. The method of claim 11 wherein the strip of fabric and at least a portion of the at least one glue line are removed from the top surface of the top cell by freezing and then cracking the at least one glue line.

19. The method of claim 11 wherein the strip of fabric and at least a portion of the at least one glue line are removed from the top surface of the top cell by applying a solvent to the at least one glue line, allowing at least a portion of the at least one glue line to dissolve and pulling the strip of fabric and at least a portion of the at least one glue line away from the top surface of the top cell.

20. The method of claim 19 wherein the solvent is methylene chloride.

* * * * *